United States Patent
Gailloux et al.

(10) Patent No.: US 8,060,591 B1
(45) Date of Patent: Nov. 15, 2011

(54) AUTOMATIC DELIVERY OF ALERTS INCLUDING STATIC AND DYNAMIC PORTIONS

(75) Inventors: Michael A. Gailloux, Overland Park, KS (US); Devon L. Biere, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 655 days.

(21) Appl. No.: 11/217,654

(22) Filed: Sep. 1, 2005

(51) Int. Cl.
*G06F 15/173* (2006.01)

(52) U.S. Cl. .................................... 709/223; 379/88.16

(58) Field of Classification Search .................. 709/223; 379/88.16
See application file for complete search history.

(56) References Cited

U.S. PATENT DOCUMENTS

| | | | |
|---|---|---|---|
| 5,692,038 A * | 11/1997 | Kraus et al. | 379/207.13 |
| 5,991,306 A * | 11/1999 | Burns et al. | 370/429 |
| 6,414,725 B1 | 7/2002 | Clarin et al. | |
| 6,473,099 B1 * | 10/2002 | Goldman et al. | 715/749 |
| 6,571,255 B1 | 5/2003 | Gonsalves et al. | |
| 6,714,826 B1 | 3/2004 | Curley et al. | |
| 6,735,771 B1 | 5/2004 | Houlding | |
| 6,847,892 B2 * | 1/2005 | Zhou et al. | 701/213 |
| 6,943,681 B2 | 9/2005 | Rezvani et al. | |
| 6,993,246 B1 | 1/2006 | Pan et al. | |
| 6,993,349 B2 * | 1/2006 | Martinez et al. | 455/456.4 |
| 7,005,963 B1 * | 2/2006 | Scalisi et al. | 340/7.1 |
| 7,031,437 B1 * | 4/2006 | Parsons et al. | 379/88.12 |
| 7,103,391 B2 | 9/2006 | Chan | |
| 7,136,482 B2 | 11/2006 | Wille | |
| 7,142,645 B2 * | 11/2006 | Lowe | 379/88.16 |
| 7,221,855 B2 | 5/2007 | Kim et al. | |
| 7,391,300 B2 | 6/2008 | Inkinen | |
| 7,409,569 B2 | 8/2008 | Illowsky et al. | |
| 7,424,446 B2 | 9/2008 | Emodi et al. | |
| 2004/0111525 A1 | 6/2004 | Berkland et al. | |
| 2004/0234250 A1 | 11/2004 | Cote et al. | |
| 2004/0260761 A1 | 12/2004 | Leaute et al. | |
| 2005/0080768 A1 | 4/2005 | Zhang et al. | |
| 2005/0129196 A1 | 6/2005 | Creamer et al. | |
| 2005/0136988 A1 * | 6/2005 | Villamil et al. | 455/567 |
| 2005/0185918 A1 | 8/2005 | Lowe | 386/46 |

(Continued)

FOREIGN PATENT DOCUMENTS

WO    WO 2006002645 A1    1/2006

OTHER PUBLICATIONS

S.J. Caughey et al., "*Metabroker: A Generic Broker for Electronic Commerce*," Technical Report 635, Department of Computing Science, University of Newcastle upon Tyne, Mar. 1998, pp. 1-13.

(Continued)

*Primary Examiner* — Krista Zele
*Assistant Examiner* — Andrew Georgandellis

(57) ABSTRACT

A device detects an alert event and responds by playing out an alert including a static media portion and a first dynamic media portion. The device maintains, in data storage, alert data that includes the static media portion and the first dynamic media portion. A network server sends the device data for updating the alert data stored in data storage. The data for updating the alert data includes a new dynamic media portion. The device stores the received data including the new dynamic media portion and thereafter plays out an alert including the static media portion and the new dynamic media portion when the device detects an alert event.

26 Claims, 5 Drawing Sheets

U.S. PATENT DOCUMENTS

| | | | |
|---|---|---|---|
| 2005/0197167 | A1 | 9/2005 | Aoike |
| 2006/0028951 | A1* | 2/2006 | Tozun et al. ............ 369/84 |
| 2006/0077055 | A1* | 4/2006 | Basir .............. 340/539.13 |
| 2006/0085188 | A1 | 4/2006 | Goodwin et al. |
| 2006/0117040 | A1 | 6/2006 | Begeja et al. |
| 2007/0112977 | A1 | 5/2007 | Hornal et al. |
| 2007/0201685 | A1 | 8/2007 | Sindoni |
| 2007/0204042 | A1 | 8/2007 | Noble |
| 2007/0233905 | A1 | 10/2007 | Hatano et al. |
| 2008/0104258 | A1 | 5/2008 | O'Neill et al. |
| 2008/0167993 | A1 | 7/2008 | Cue et al. |

OTHER PUBLICATIONS

U.S. Appl. No. 11/046,083, filed Jan. 28, 2005, entitled Method and System for Calendar-Based Delivery of Themed User-Interface Skins.

Jason Fields, MP3 Speaking Ringtones for 802se, Mar. 8, 2005, http://www.air-port.com/blog2/03/08/2005/mp3-speaking-ringtones-for-802se/, printed from the World Wide Web on Jul. 15, 2005.

Hayden Porter, Phone It In!, Feb. 1, 2004, http://emusician.com/mag/desktop/emusic_phone/, printed from the World Wide Web on Jul. 15, 2005.

Pictones, http://www.musiwave.net/pictones-multimedia-ringtones.html, printed from the World Wide Web on Sep. 1, 2005.

Musitones, http://www.musiwave.net/musitones-real-music-ringtones.html, printed from the World Wide Web on Sep. 1, 2005.

Logo & Images, http://www.musiwave.net/mobile-phone-services-provider.html, printed from the World Wide Web on Sep. 1, 2005.

U.S. Appl. No. 11/237,058, entitled "Automatic Rotation through playout of audio-clips in response to detected alert events," filed Sep. 28, 2005.

U.S. Appl. No. 11/656,803, entitled "Method and system for demarcating a portion of a media file as a ringtone," filed Jan. 22, 2007.

"Theme Master—A Pocket PC Utility Used to Switch Your Today Screen Theme," Theme Master, http://www.theraggios.com/rpa/ThemeMaster.htm, printed from the World Wide Web on Dec. 7, 2005.

"Cell Phone Wallpaper," Free Cell Phone Wallpaper, http://www.flash-screen.com/free-wallpaper/cell-phone-wallpaper.html, printed from the World Wide Web on Dec. 6, 2005.

LightWav 5 for Treo600/650 5.72, http://www.palmgear.com/index.cfm?fuseaction=software.showsoftware&PartnerREF=&siteid=1&prodid=92488&siteid=1, printed from the World Wide Web on Sep. 27, 2005.

LightWAV 5.7.2, http://mytreo.net/downloads/details-108-html-?LightWav, printed from the World Wide Web on Sep. 27, 2005.

Verizon Wireless, VZW Tones, Feb. 22, 2005.

Caller Ringtones, http://crt.maxis.com.my/prbt/user_console/RbtAdmin/english/BrowsingPage.jsp, printed from the World Wide Web on Sep. 27, 2005.

Phillip Torrone, pt's "How-to" Tuesday, How to make your own Ringtones . . . , printed from the World Wide Web from http://www.engadget.com/2004/05/25/pts-how-to-tuesday-how-to-make-your-own-ringtones/, May 25, 2004.

H. Schulzrinne et al., RTP: A transport for Real-Time Applications, Network Working Group—Request for Comments: 3550, Jul. 2003.

* cited by examiner

AUTOMATIC DELIVERY OF ALERTS INCLUDING STATIC AND DYNAMIC PORTIONS

FIELD OF INVENTION

The present invention relates to events that warrant alerting one or more persons that the event has occurred or is occurring, and more particularly, to devices that play out alerts in response to detecting such events.

DESCRIPTION OF RELATED ART

An alert event is an event that warrants playing out an alert so as to provide notice that the event has occurred or is occurring. The alert may be played out for a single person or a group of people. The alert may be played out by a device upon detecting that the event has occurred or is occurring.

Examples of alert events include: (i) the closure of a doorbell switch or another type of switch, (ii) a telephone receiving a signal that indicates a phone call is available for connection to the telephone, (iii) a personal computer receiving a signal that indicates an Instant Message (IM) or another type of message has been received at the personal computer, and (iv) a programmable logic controller (PLC) detecting a fluid level of a fluid-holding reservoir has met or surpassed a particular fluid level threshold. Other examples of alert events are also possible.

An alert is a means to provide notice that an alert event has been detected. As an example, an alert may comprise a sound or combination of sounds played out to provide notice that an alert event has been detected. For example, an alert played out in response to an alert event consisting of the closure of a door bell switch may include chiming a mechanical bell or electronically playing a predetermined sequence of musical notes. As another example, an alert played out in response to an alert event consisting of a telephone receiving a signal that indicates a phone call is available for connection to the telephone may include playing a ringtone (e.g., a sequence of musical notes).

As yet another example, an alert played out in response to an alert event consisting of a personal computer receiving a message that indicates an electronic mail (e-mail) message has been received for a user of the computer may include playing out the spoken words "You've got mail," which are encoded in a computer-readable file. Other examples of playing out an alert to provide notice that an alert event has been detected are also possible.

A variety of devices may be arranged to detect an alert event and to responsively play out an alert. For example, a wireless communication device, such as cellular telephone, may be arranged to detect when a phone call is available for connection to the wireless communication device and to responsively play out an alert to provide notice that the phone call may be connected to the device. In accordance with this example, the alert may comprise playing out a ringtone or causing the wireless communication device to vibrate.

Some devices that detect alert events and responsively play out an alert may be arranged to run an application that allows a user to select a ringtone from a remote system. In response to the user selecting the ringtone, the remote system sends data defining the ringtone to the device. The device receiving the data defining the ringtone can store the data and then play out the ringtone in response to detected alert events. The inventors have discovered that the presently known means for updating a device with data defining a selected ringtone (e.g., selecting a ringtone and receiving data that defines the ringtone) can be quite burdensome to a user of the device, and thus an improved system and method are desirable.

SUMMARY

The present invention advances over the existing art by providing an improved method and system that can be carried out by devices that detect and respond to alert events.

In one respect, an exemplary embodiment of the present invention may be arranged as a system that comprises a processor, a communication interface for receiving data, and data storage. The data storage contains alert data defining a static media portion and one or more dynamic media portions, and computer-readable program instructions executable by the processor. The processor executes the program instructions to detect a first alert event and responsively play out a first alert including the static media portion and at least one of the one or more dynamic media portions. The communication interface then receives alert update data defining a new dynamic media portion from a network server and the processor executes program instructions to store the alert update data in the data storage. After receiving the alert update data, the processor executes program instructions to detect a second alert event and responsively play out a second alert including the static media portion and the new dynamic media portion.

In another respect, an exemplary embodiment of the present invention may be arranged as a method carried out by a device that detects and responds to alert events. The method includes: (i) maintaining, in data storage of the device, alert data including a first static media portion and a first dynamic media portion, (ii) detecting a first alert event, and responsively playing out a first alert including the first static media portion and the first dynamic media portion, (iii) thereafter receiving into the device, from a network server, alert update data defining a second dynamic media portion, and storing the alert update data in the data storage, and (iv) detecting a second alert event, and responsively playing out a second alert including the first static media portion and the second dynamic media portion.

In yet another respect, another exemplary embodiment of the present invention may be arranged as a method carried out by a device that detects and responds to alert events. This method includes: (i) maintaining, in data storage of the device, alert-tone data including a first static media portion and a first dynamic media portion, (ii) detecting a first alert event, and responsively playing out a first alert-tone including the first static media portion and the first dynamic media portion, (iii) thereafter receiving into the device, from a network server, alert-tone-update data defining a second dynamic media portion, and storing the alert-tone-update data in the data storage, and (iv) detecting a second alert event, and responsively playing out a second alert-tone including the first static media portion and the second dynamic media portion.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

The present invention provides an improvement over existing methods and systems that detect alert events and responsively play out an alert. According to the present invention, when a device detects an alert event, the device responds by playing out an alert including a dynamic media portion and a static media portion. Alert data maintained in the device comprises the dynamic media portion and the static media portion. The dynamic media portion is a media portion that is updated when the alert data is being updated. On the other hand, the static media portion is a media portion that is generally not updated when the alert data is being updated.

Each dynamic media portion and each static media portion played out for a given alert comprises a respective media portion of at least one of a variety of types of media. As an example, an alert played out by a device may comprise aural media such as speech or musical passages (e.g., songs and/or ringtones). Aural media comprise media that can be experienced by a person's sense of hearing. As an example, an alert played out by a device may comprise: (i) a static media portion including an introductory speech, such as "You have a phone call," and (ii) a dynamic media portion that comprises at least a portion of a first song.

As another example, an alert played out by a device may include visual media that comprises text, graphics, animations, and/or video. Visual media comprise media that can be experienced by a person's sense of sight. As an example, an alert played out by a device may comprise: (i) a static media portion including an introductory speech, such as "You have a phone call. Look at your display to see your local weather conditions." and (ii) a dynamic media portion that comprises an animation showing a series of weather radar images for a user's location. In this example, the alert comprises both aural media and visual media.

As yet another example, an alert played out by a device may comprise tactile media such as a vibration of a device or a vibration of one or more components within the device. Tactile media comprises media that can be experienced by a person's sense of touch. As an example, an alert played out by a device may comprise: (i) a static media portion that includes a component within a device vibrating for a particular length of time (e.g., 2 seconds), and (ii) a dynamic media portion that comprises at least a portion of a news recording. Other examples of the various types of media, other examples of alerts, and other examples of an alert comprising a static media portion of a first type of media (e.g., aural media) and a dynamic media portion of a second type of media (e.g., visual media) are also possible.

2. Exemplary Architecture

Figure 1:
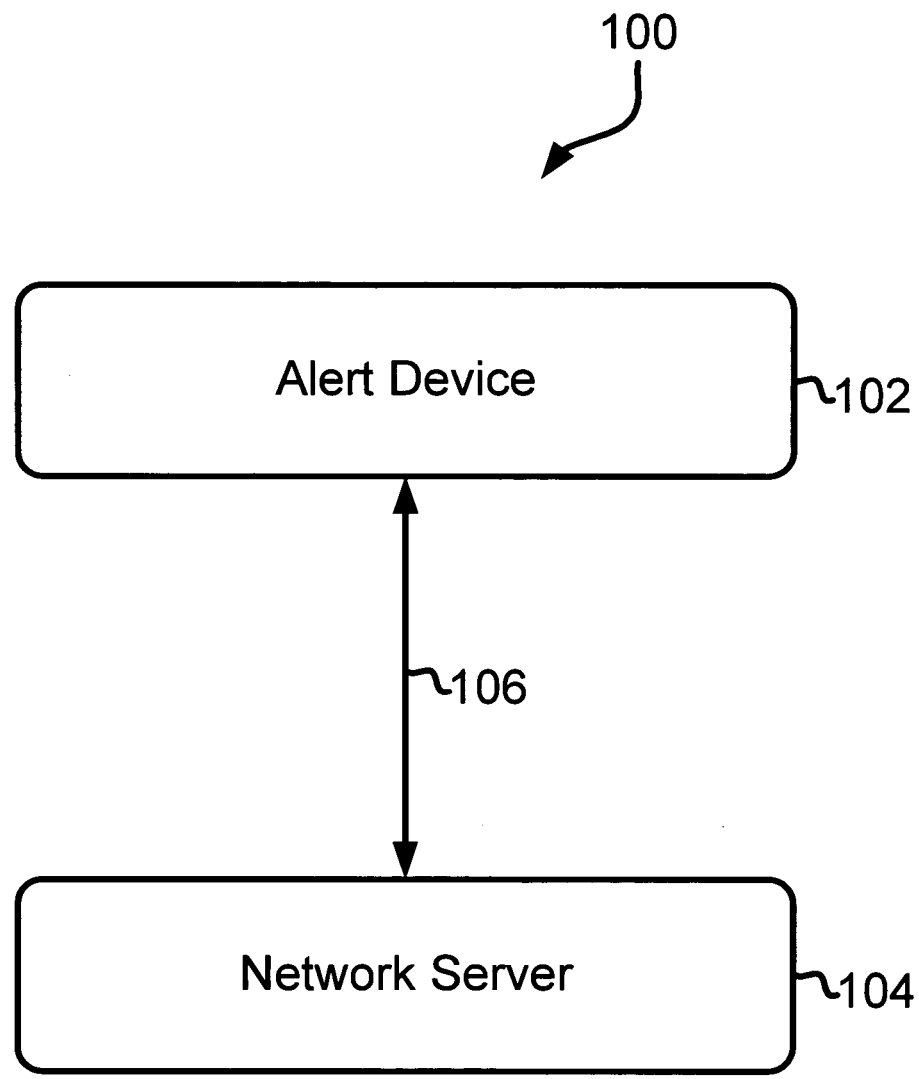
FIG. 1 is a block diagram depicting an exemplary system for use in carrying out the invention.

An exemplary embodiment of the present invention may be carried out in a system 100 as shown in FIG. 1. As illustrated, the system 100 comprises an alert device 102, a network server 104, and a communication network 106.

It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

The alert device 102 may comprise any of a variety of devices that (i) detect alert events and responsively play out alerts, and (ii) communicate with the network server 104 via the communication network 106.

As an example, the alert device 102 may be arranged as a wireless communication device, such as cellular phone. An alert device arranged as a wireless communication device may carry out communications according to one or more air interface communication protocols, such as the Code Division Multiple Access (CDMA) protocol, the Global System for Mobile communication (GSM) protocol, and/or the 1× Evolution for Data Only (1×EV-DO) protocol. Other examples of the one or more air interface communication protocols are also possible. An alert device arranged as a wireless communication device may be arranged to perform Wireless Application Protocol (WAP) functions and/or Over The Air Service Provisioning (OTASP) functions with the network server 104 so as to carry out the present invention.

As another example, the alert device 102 may be arranged as a communication device that physically couples to the communication network 106. For instance, the alert device 102 may be arranged as a Session Initiation Protocol (SIP) telephone (or another type of telephone) that physically couples to the communication network 106. In another instance, the alert device 102 may be arranged as a computer (e.g., a desktop computer, a notebook computer, or a programmable logic controller (PLC)) that physically couples to the communication network 106. Other examples of the alert device 102 are also possible.

The network server 104 may be arranged in various configurations. For example, the network server 104 may be arranged as a computer shared by a plurality of devices. The alert device 102 may be one of the plurality of devices that share the network server 104. As another example, the network server 104 may comprise a computer program that provides a service to other client programs. In this regard, the network server 104 may provide a service to a client program stored on the alert device 102. The client program stored on the alert device 102 may be stored as computer-readable program instructions. As yet another example, the network server 104 may be arranged as a shared computer and a program that provides a service to client programs.

The network server 104 may be arranged to provide various services to one or more client programs on the alert device 102. For example, the network server 104 may be arranged to distribute media updates in the form of dynamic media portions to the alert device 102 for updating alerts played out by the alert device 102. The network server 104 may receive the media updates in various ways. For example, the network server 104 may receive media updates from a media server (not shown) connected to the communication network 106. As another example, the network server 104 may receive media updates by a user entering data via a user interface of the network server 104, such as a keyboard. Other examples of the network server 104 receiving media updates are also possible.

A media server that provides media updates to the network server 104 may operate a client program that occasionally (e.g., periodically) sends the media updates to the network server 104. The media server may send a variety of media updates to the network server 104. For example, the media server may send an audio and/or video media update comprising a news recording. In this regard, the news recording could comprise world news, national news, financial news, and/or sports news. As another example, the media server may send an audio media update comprising at least a portion of the latest best-selling song. As yet another example, the media server may send an audio and/or video media update comprising a warning about a local weather condition. Other examples of a media update sent to the network server 104 are also possible. A media update that the media server sends to the network server 104 may be used as a dynamic media portion for sending to the alert device 102.

The communication network 106 provides means for performing unidirectional or bidirectional data communication between the alert device 102 and the network server 104. One or more other devices may also communicate over at least a portion of the communication network 106.

The communication network 106 may include one network or a combination of two or more networks. For example, the communication network 106 may include a private network and/or a public network. A private network comprises a network established and operated by a private organization or corporation for users within that organization or corporation. An example of a private network is a Private Branch eXchange (PBX). A public network is a network designed for open, public access. An example of a public network is the Public Switched Telephone Network (PSTN).

As another example, the communication network 106 may include a circuit-switched network and/or a packet-switched network. A circuit-switched network is a network in which a continuous link is established between a data-sending device (e.g., the network server 104) and a data-receiving device (e.g., the alert device 102) for the duration of a communication session. An example of a circuit-switched network is the PSTN. A packet-switched network is a network in which packets (e.g., messages or fragments of messages) are individually routed between devices on the packet-switched network, with no previously established communication path. An example of a packet-switched network is the Internet.

As yet another example, the communication network 106 may comprise a Local Area Network (LAN), a Metropolitan Area Network (MAN), and/or a Wide Area Network (WAN).

Figure 2:
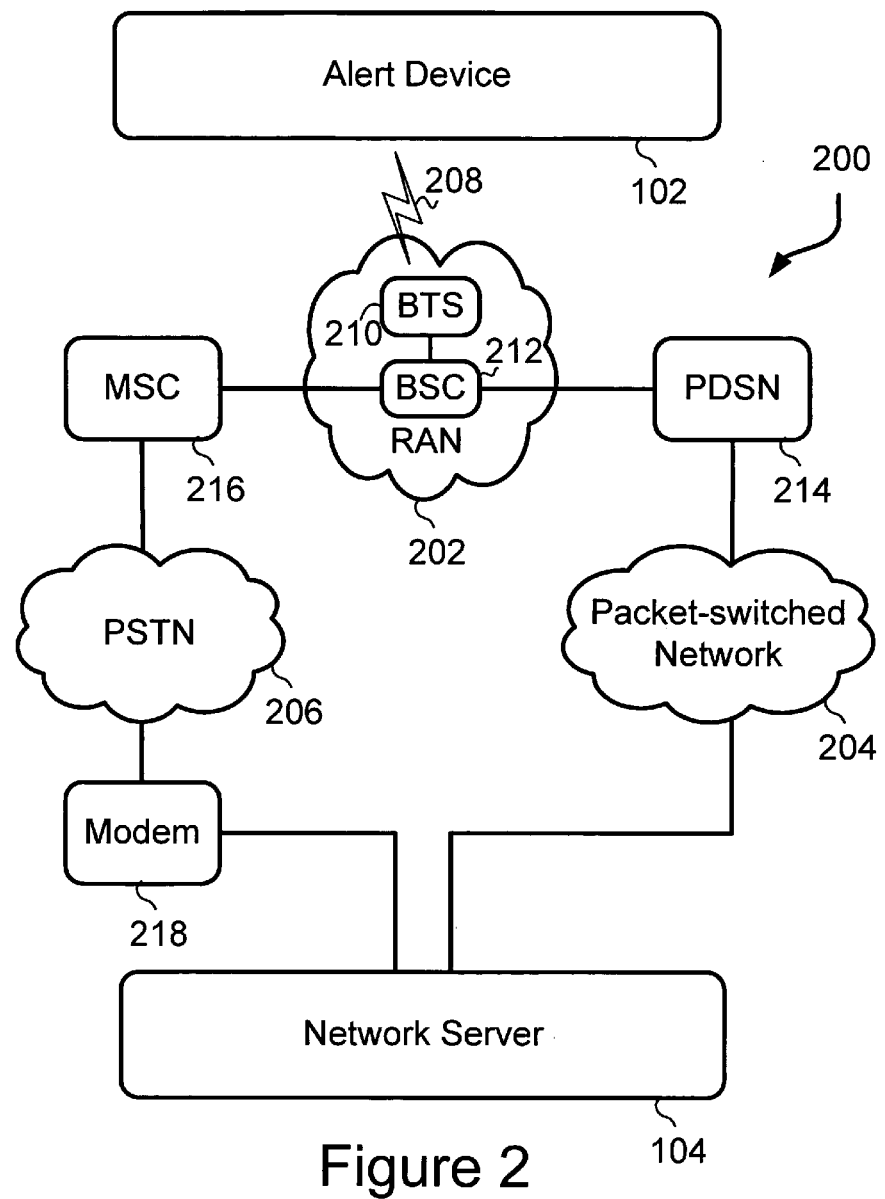
FIG. 2 is a block diagram depicting an exemplary communication network for use in carrying out the invention.

As still yet another example, in accordance with the example of the alert device 102 comprising a wireless communication device, the communication network 106 may be arranged as the communication network 200 shown in FIG. 2. As shown in the figure, the communication network 200 comprises a Radio Access Network (RAN) 202, a packet-switched network 204, and a Public Switched Telephone Network (PSTN) 206.

The RAN 202 comprises a radio frequency (RF) air interface 208, a Base Transceiver Station (BTS) 210, and a Base Station Controller (BSC) 212 coupled to the BTS 210. The RAN 210 may comprise one or more other BTSs as well. The BTS 210 forms a corresponding cell by radiating signals away from the BTS 210. The signals radiated away from the BTS 210 form the RF air interface 208 and may be arranged according to the CDMA air interface protocol or some other air interface protocol.

The BSC 212 performs many functions. For example, the BSC 212 manages the use of the BTS 210. The BSC 212 also controls the handoff of a wireless communication device (e.g., the alert device 102) from the BTS 210 to another BTS as the wireless communication device moves from one cell to another cell.

The BSC 212 provides a connection interface to a gateway, such as a Packet Data Serving Node (PDSN) 214. The PDSN 214 provides an interface between the BSC 212 and the packet-switched network 204. The PDSN 214 facilitates establishing, maintaining, and terminating point-to-point protocol (PPP) links for the alert device 102. The alert device 102 can establish a PPP link with the PDSN 228. After establishing a PPP link, the alert device 102 can communicate with the network server 104 via the packet-switched network 204.

A mobile switching center (MSC) 216 is a switch that provides means for connecting the RAN 202 to the PSTN 206. The PSTN 206 may be coupled to a modem 218 that, in turn, is coupled to the network server 104. The MSC 216 can provide connection to one or more trunk lines of the PSTN 206 for establishing a path through the PSTN 206 for use in carrying out data communication between the alert device 102 and the network server 104.

Figure 3:
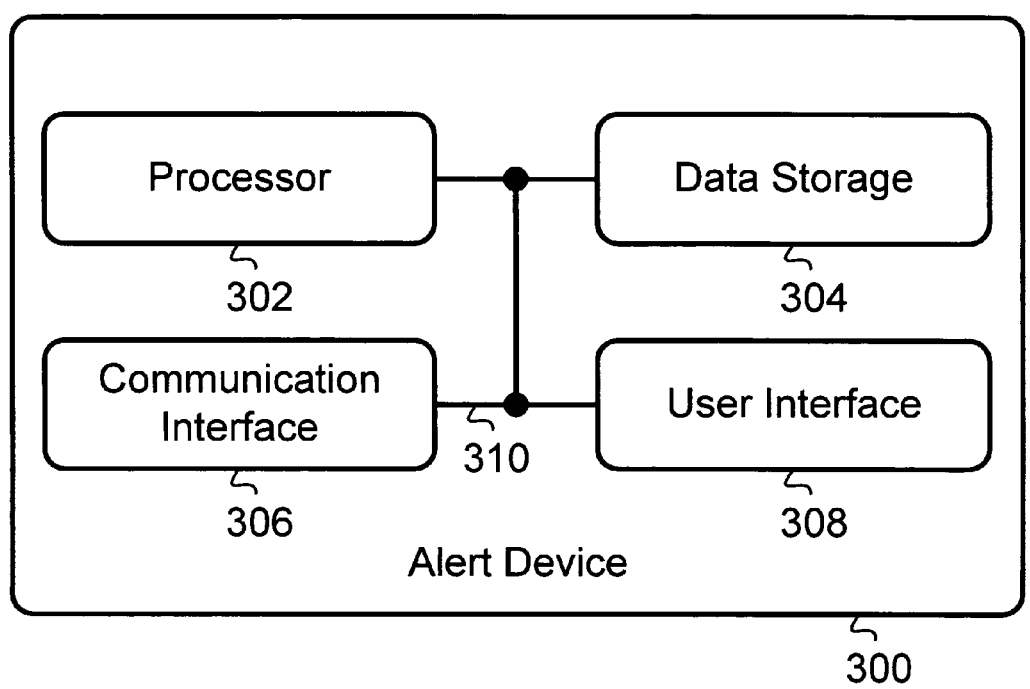
FIG. 3 is a block diagram depicting an exemplary alert device for use in carrying out the invention.

FIG. 3 illustrates a block diagram of an alert device 300 for use in carrying out an exemplary embodiment of the present invention. As shown in FIG. 3, the alert device 300 comprises a processor 302, data storage 304, a communication interface 306, and a user interface 308, all linked together via a system bus, network, or other connection mechanism 310.

The processor 302 may comprise one or more processors (e.g., a general purpose processor and/or a digital signal processor). The processor 302 provides means for executing computer-readable program instructions. Execution of the computer-readable program instructions may occur to carry out the functions described herein.

For example, the processor 302 may execute computer-readable program instructions to convert data (e.g., binary data representing a song) into a signal that can be output by a user interface device (e.g., an analog voltage signal that can be output by a loud speaker). Other examples of program instructions executable by the processor 302 are also possible, some of which are explained below.

The data storage 304 comprises a computer readable medium for storing various types of data. The computer-readable medium may comprise volatile and/or non-volatile storage components, such as optical, magnetic, organic or other memory or disc storage. The computer-readable medium of the data storage 304 may be integrated in whole or in part with the processor 302.

Figure 4:
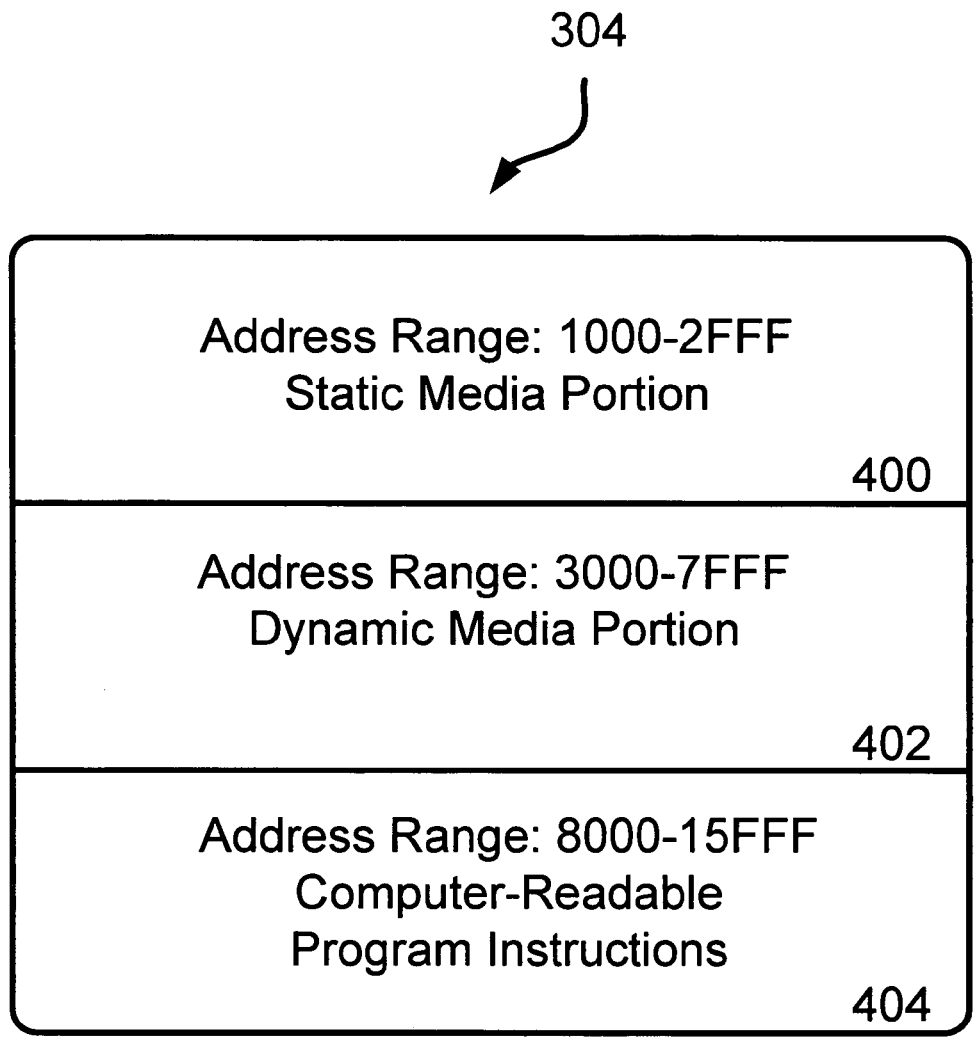
FIG. 4 is an illustration of exemplary blocks of data that may be stored in data storage.

FIG. 4 depicts various blocks of data storage that may be defined within the data storage 304. As shown in FIG. 4, the data storage 304 includes a first block of data storage 400, a second block of data storage 402, and a third block of data storage 404. Alternatively, the data storage 304 may comprise a number of defined blocks of data storage that is greater than or less than three defined blocks of data storage, and may not comprise any defined blocks of data storage.

The first block of data storage 400 may comprise data storage having a hexadecimal address range of 1000 to 2FFF (i.e., 8,192 bytes of data). The first block of data storage 400 may be defined as an area of the data storage 304 for storing data that includes a static media portion. Other examples of an address range for the first block of data storage 400 are also possible.

The second block of data storage 402 may comprise data storage having a hexadecimal address range of 3000 to 7FFF (i.e., 16,384 bytes of data). The second block of data storage 402 may be defined as an area of the data storage 304 for storing data that includes a dynamic media portion. Other examples of an address range for the second block of data storage 402 are also possible.

The third block of data storage 404 may comprise data having a hexadecimal address range of 8000 to 15FFF (i.e., 57,344 bytes of data). The third block of data storage 404 may be defined as an area of the data storage 304 for storing computer-readable program instructions. Other examples of an address range for the third block of data storage 404 are also possible.

The alert device 300 may occasionally receive alert update data. The alert update data may include data that defines one or more new dynamic media portions. In response to receiving the alert update data, the processor 302 may execute program instructions that cause the data storage 304 to store the alert update data. For example, the processor 302 may execute program instructions that cause the data storage 304 to store the alert update data (e.g., a new dynamic media portion) in at least a portion of the second block of data storage 402 (i.e., hexadecimal address range 3000-7FFF). For alert update data having a new dynamic media portion that is some number of data bytes less than the number of data bytes of the second block of data storage 402, storing the alert update data comprises storing the alert update data in only a portion of the second block of data storage 304.

Moreover, when the processor 302 executes the program instructions to store the alert update data, a dynamic media portion previously stored at the second block of data storage 402 may be overwritten during the storage of the alert update data. In this way, a dynamic media portion previously stored at the second block of data storage 402 may no longer be available for playing out as an alert.

As another example, the data storage 304 may include one or more additional blocks of data storage. These additional blocks of data storage may be defined as blocks of data storage for storing data that includes one or more other static media portions, data that includes one or more other dynamic media portions, and/or data other than static media portions or dynamic media portions. In accordance with this example, when the processor 302 executes program instructions that cause the data storage 304 to store alert update data, the data storage 304 may store the alert update data in one of the additional blocks of data storage. In this way, if the second block of data storage 402 contains the data including a first dynamic media portion, then the first dynamic media portion may be played out as an alert while the data storage is storing the alert update data in the one of the additional blocks of data storage.

Moreover, after storing the alert update data, the first dynamic media portion could still be available for playing out in an alert. It may be necessary to play out an alert using the first dynamic media portion after storing the alert update data if, for example, a user does not approve of using a new dynamic media portion of the alert update data. Other examples of playing out an alert using the first dynamic media portion after storing alert update data in data storage are also possible.

Returning to FIG. 3, the communication interface 306 provides means for receiving data. In response to the communication interface 306 receiving data, the processor 302 may execute computer-readable program instructions that cause the received data to be processed by the alert device 300. A variety of methods may be used to process the data received at the communication interface 306. For example, the processor 302 may execute program instructions that cause alert update data received at the communication interface 306 to be stored at the data storage 304. As another example, the processor may execute program instructions that cause data received at the communication interface 306 to be presented at the user interface 308. In this regard, the received data may include a request to prompt a user for approval of a network server transmitting alert update data to the alert device 300. Other examples of the processor 302 executing program instructions to process the received data are also possible.

The communication interface 306 also provides means for transmitting data. The processor 302 may execute computer-readable program instructions that cause the communication interface 306 to transmit data. As an example, the processor 302 may execute program instructions that cause the communication interface 306 to occasionally transmit requests for alert update data to a network server. As another example, the processor 302 may execute program instructions that cause the communication interface 306 to transmit, to a network server, data that indicates the alert device 300 approves of receiving alert update data from the network server. As yet another example, the processor 302 may execute program instructions that cause the communication interface 306 to transmit, to a network server, a confirmation message that indicates alert update data has been received at the alert device 300. Other examples of the communication interface 306 transmitting data are also possible.

The communication interface 306 may be arranged in various configurations. In the example, where an alert device is arranged as a wireless communication device, the communication interface 306 may be arranged as an interface that includes a chipset and an antenna for interfacing with a RAN. An exemplary chipset that facilitates air interface communication according to the CDMA protocol is the MSM6000™ chipset manufactured by Qualcomm Incorporated of San Diego, Calif.

In the example where an alert device is arranged as a computer or PLC, the communication interface 306 may be arranged as an interface that includes a Network Interface Card (NIC). The NIC could be a NIC that is physically coupled to the communication network 106 or could be a wireless NIC that communicates with the communication network 106 via as the IEEE 802.11 air interface standards established by the Institute of Electrical and Electronics Engineers (IEEE), Inc. Other examples of configurations of the communication interface 306 are also possible.

The user interface 308 provides means for the alert device 102 to present data to a user. The user interface 308 may be arranged in various configurations for presenting data to the user. For example, the user interface 308 may comprise one or more loud speakers for playing out alert data including media portions arranged as aural media (i.e., alert-tones). To play out the aural media at the one or more loud speakers, the processor 302 may convert a static media portion and/or a dynamic media portion into analog voltage signals that can be converted to sound by the one or more loud speakers.

As another example, the user interface 308 may comprise one or more displays. The one or more displays can play out alert data including media portions arranged as visual media. To play out the visual media, the processor 302 may provide the alert data including a static media portion and/or a dynamic media portion to the one or more displays so as to present the visual media to a user of the alert device 102. The one or more displays may comprise a Liquid Crystal Display (LCD) and/or some other type of display.

As yet another example, the user interface 308 may comprise means for playing out alerts that include media portions arranged as tactile media. The means for playing out such alerts may comprise (i) a motor having a spindle, and a weight attached to the motor spindle, or (ii) a vibrating battery. Other examples of means for playing out alerts that include media portions arranged as tactile media are also possible.

The user interface 308 may prompt a user for approval of whether the alert device should carry out particular functions before the alert device 300 carries out the particular functions. For example, the user interface 308 may prompt a user for approval of whether to receive alert update data. As another example the user interface may prompt a user for approval to play out a second alert in place of a first alert. The user interface 308 may present such prompts by displaying messages on a display of the user interface 308. In response to presenting a prompt seeking user approval before the alert device carries out particular functions, a user can communicate whether the user approves of the function being carried out. The user can communicate such approval by any of a variety of means for communicating data into the alert device. The alert device can condition carrying out the particular functions on receipt of the user communicating his or her approval.

The user interface 308 may provide various means for a user to communicate data into the alert device 102. For example, the user may communicate media into the alert device 102 by uttering sounds detectable by a microphone. A microphone and associated circuitry detecting the uttered sounds may convert the detected sounds to data storable at the data storage 304. As another example, the user may utter the sounds "You have a new phone call" for storing as a static media portion to be played out when the alert device 102 detects that a phone call is available for connection to the alert device 102.

As another example, the user may communicate, into the alert device 102, data that indicates whether the user approves of the alert device 102 receiving alert update data. In this regard, the user interface 308 may include a first button that may be pressed to communicate data that indicates the user approves of receiving alert update data and a second button that may be pressed to communicate data that indicates the user does not approve of receiving the alert update data. Alternatively, or in combination, the user interface 308 may comprise an interactive voice response system that allows a user to communicate data into the alert device by speaking. Other examples of means for communicating data into the alert device 300 are also possible.

3. Exemplary Operation

Figure 5:
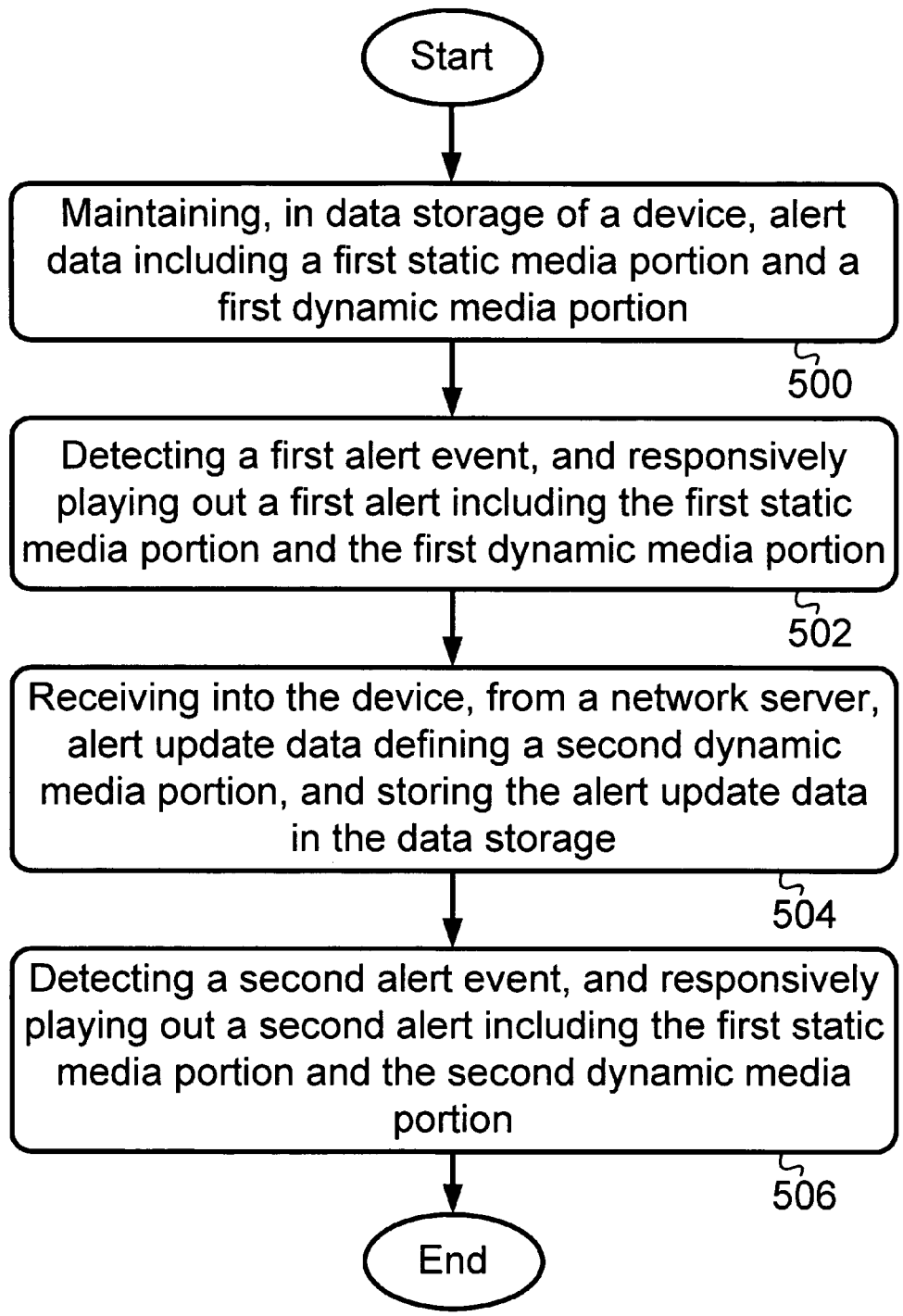
FIG. 5 is a flow chart depicting a set of functions that can be carried out in accordance with an exemplary embodiment.

FIG. 5 is a flow chart provided to illustrate some of the functions that may be carried out in accordance with an exemplary embodiment. As shown in FIG. 5, block 500 includes maintaining, in data storage of a device, alert data including a first static media portion and a first dynamic media portion. As an example, the device that maintains the alert data in the data storage may be arranged as the alert device 300 shown in FIG. 3.

A variety of functions may be carried out in maintaining the alert data in data storage. For example, maintaining the alert data in data storage may include executing program instructions that cause the alert data to be stored in the data storage. In this regard, the alert data may comprise default alert data that are stored in the data storage at the time the device is being manufactured, and/or the alert data may comprise data that are received by the device some time after the device has been manufactured (e.g., alert update data). As another example, if the data storage maintaining the alert data is volatile data storage, then maintaining the alert data may comprise continually providing electrical power to the data storage. As yet another example, maintaining the alert data may comprise executing program instructions that prevent the alert data from being over-written by other data. Other examples of functions carried out in maintaining the alert data in the data storage are also possible.

In one exemplary embodiment of the present invention, the alert device may maintain alert data, including one static media portion and one dynamic media portion, for one or more types of alert events. In another exemplary embodiment, the alert device may maintain alert data including a respective static media portion and a respective dynamic media portion for each type of alert event of a plurality of types of alert events.

Next, block 502 includes detecting a first alert event, and responsively playing out a first alert including the first static media portion and the first dynamic media portion. The first alert event may comprise any of a variety of alert events.

For example, an alert event, such as the first alert event, may comprise the alert device 102 receiving data that indicates a phone call is available for connection to the alert device 102. The phone call may be a phone call placed over a RAN, a SIP-based phone call placed over a packet-switched network, or another type of phone call. Other examples of an alert event comprising the alert device 102 receiving data that indicates a phone call is available for connection to the alert device are also possible.

As another example, an alert event, such as the first alert event, may comprise the alert device 102 receiving a message. The message may be transmitted to the alert device 102 over the communication network 106 or over another communication network. For example, the message may comprise an Instant Message (IM), a Short Message Service (SMS) message, or an e-mail message. Other examples of an alert event comprising the alert device receiving a message are also possible.

As yet another example, an alert event, such as the first alert event, may comprise the alert device 102 receiving message-alert data. The message-alert data may be transmitted to the alert device 102 over the communication network 106 or over another communication network. As an example, the message-alert data may comprise data that indicates a message has been received and/or stored for a user of the alert device 102, such as data that indicates a voice-mail message has been stored for a user of the alert device.

As still yet another example, an alert event, such as the first alert event, may comprise the alert device 102 detecting that a predefined threshold has been met and/or surpassed. As examples, the predefined threshold may define a threshold for a flow level, a pressure level, or a temperature. The alert device 102 may receive signals, from one or more sensors, that indicate a flow level, a pressure level, or a temperature. The alert device 102 may compare the received signals to the predefined threshold so as to detect whether the predefined threshold has been met and/or surpassed. Other examples of alert events are also possible.

Detecting the alert event may be carried out using any of a variety of methods. Detecting the alert event may comprise the processor 302 executing computer-readable program instructions to detect the alert event. As an example, the processor 302 may execute computer-readable program instructions that cause the communication interface 306 to send a received signal to the processor 302 so that the processor 302 can parse the received signal to obtain information that indicates that a phone call is available for connection to the alert device 300. As another example, the processor 302 may execute computer-readable program instructions that cause the communication interface 306 to send a text message (or message alert data) received at the communication interface 306 to the processor 302 so as to provide notice to the processor 302 that the text message or message alert data has been received. Other examples of the processor 302 executing computer-readable program instructions to detect an alert event are also possible.

Various methods may be used to play out the first alert including the first static media portion and the first dynamic media portion. For instance, playing out the first alert may include playing out the first static media portion followed by the first dynamic media portion. As another example, playing out the first alert may include playing out the first dynamic media portion followed by the first static media portion. As another example, playing out the first alert may include playing out the first static media portion followed by the first dynamic media portion followed by the first static media portion.

As yet another example, playing out the first alert may include playing out the first static media portion and the first dynamic media portion concurrently. In accordance with this example, the first static media portion may include audible media such as a selection of background music and the first dynamic media portion may include audio media such as a news recording, such that playing out the first alert includes playing out the news recording and the background music concurrently. Other examples of the static media portion and the dynamic media portion played out concurrently are also possible.

As still yet another example, the data storage may maintain alert data that further includes a second static media portion. In accordance with this example, playing out the first alert may include playing out the first static media portion followed by the first dynamic media portion followed by the second static media portion. Other examples of playing out the first alert are also possible.

Next, block 504 includes receiving into the device, from a network server, alert update data defining a second dynamic media portion, and storing the alert update data in the data storage. The alert update data received at the device may be alert update data that is addressed to the device. In this regard, the device may be associated with a telephone number, an Internet Protocol (IP) address, or some other identifier that may be used as an address for delivering alert update data.

In response to receiving the alert update data, the processor 302 may execute computer-readable program instructions that cause the alert update data to be stored in the data storage. Storing the alert update data in the data storage may comprise storing a new dynamic media portion in place of the first dynamic media portion. In this regard, storing the alert update data may include storing the new dynamic media portion in the second block of data storage 402. Alternatively, storing the alert update data in the data storage may comprise storing a new dynamic media portion in an additional block of data storage so that the first dynamic media portion is not over written by the second dynamic media portion.

In addition to data that defines the second dynamic media portion, the alert data may also include data that defines one or more additional dynamic media portions, such as a third dynamic media portion. In particular, for example, the alert data may include data that defines a second dynamic media portion consisting of encoded aural media (e.g., a portion of a song) and a third dynamic media portion consisting of encoded video media (e.g., a graphical image). In accordance with this example, the second dynamic media portion could be stored in the second block of data storage 402 and the third dynamic media portion could be stored in one of the additional blocks of data storage. Other examples of alert data including data that defines more than one dynamic media portion are also possible.

Next, block 506 includes detecting a second alert event, and responsively playing out a second alert including the first static media portion and the second dynamic media portion. The second alert event may comprise any of a variety of alert events. Examples of an alert event are described above with respect to block 502. In this regard, for example, if the first alert event comprises the alert device 102 receiving data that indicates a first phone call is available for connection to the alert device 102, then the second alert event may comprise the alert device receiving data that indicates a second phone call is available for connection to the alert device 102. Similarly, if the first alert event comprises the alert device 102 receiving a first message (or first message-alert data), then the second alert event may comprise the alert device 102 receiving a second message (or second message-alert data).

In the examples listed above with respect to block 506, the second alert event was the same type of alert event as the first alert event. However, the second alert event does not have to be the same type of alert event as the first alert event. For example, the first alert event may comprise the alert device 102 receiving a first text message and the second alert event may comprise the alert device 102 receiving a first message-alert data.

Detecting the alert event may be carried out using any of a variety of methods. The methods of detecting an alert event, as explained above for detecting the first alert event, may be used in carrying out the function of detecting the second alert event, as well as detecting alert events subsequent to the second alert event.

Various methods may be used to play out the second alert including the first static media portion and the second dynamic media portion. For instance, playing out the second alert may include playing out the first static media portion followed by the second dynamic media portion. As another example, playing out the second alert may include playing out the second dynamic media portion followed by the first static media portion. As another example, playing out the second alert may include playing out the first static media portion followed by the second dynamic media portion followed by the first static media portion. As yet another example, playing out the second alert may include playing out the first static media portion and the second dynamic media portion concurrently.

As still yet another example, playing out the second alert may include playing out the first static media portion, the second dynamic media portion, and any additional dynamic media portions that may be defined in the alert data that includes the data defining the second dynamic media portion. In accordance with this example, playing out the second alert may include playing out the first static media portion, the second dynamic media portion, and the additional dynamic media portions concurrently or in any given sequence that includes the first static media portion, the second dynamic media portion, and the additional dynamic media portions.

As noted in an example above, the data storage may maintain alert data that includes a second static media portion. In accordance with this example, playing out the second alert may include playing out the first static media portion followed by the second dynamic media portion followed by the second dynamic media portion. Other examples of playing out the second alert are also possible.

In playing out the first alert, the second alert, or any subsequent alert in accordance with the present invention, the alerts are played out such that a user of the alert device can perceive the alerts. By playing out alerts that include both a static media portion and a dynamic media portion, a user of the alert device may perceive alerts such as an alert that includes a news recording and background music, an alert that includes an introductory message and a graphical image, an alert that includes background music and a video, or some other combination of one or more static media portions and one or more dynamic media portions.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method carried out by an alert device that detects and responds to alert events, the method comprising:
storing, in a first data storage block within a data storage device of the alert device, a static media portion playable as part of an alert, wherein storing the static media portion in the first data storage block first occurs while the alert device is being manufactured;
storing, in a second data storage block within the data storage device of the alert device, a first dynamic media portion playable as part of an alert, wherein the second data storage block is distinct from the first data storage block, and wherein storing the first dynamic media portion in the second data storage block first occurs after the alert device is manufactured;
detecting a first alert event and responsively providing a first alert by concurrently playing out, from within the first data storage block, the static media portion and, from within the second data storage block that is distinct from the first data storage block, the first dynamic media portion;
thereafter receiving into the alert device, from a network server, alert update data defining a second dynamic media portion, and storing the alert update data in the data storage device;
prompting a user for approval to play out the second dynamic media portion instead of the first dynamic media portion, and conditioning playout of the second dynamic media portion on receipt of approval to play out the second dynamic media portion; and
after storing the alert update data in the data storage device, detecting a second alert event and, if approval to play out the second dynamic media portion has been received, then responsively providing a second alert by playing out the static media portion and the second dynamic media portion, otherwise, if approval to play out the second dynamic media portion has not been received, then responsively providing the second alert by playing out the static media portion and the first dynamic media portion.

2. The method of claim 1, wherein providing the second alert by playing out the static media portion and the second dynamic media portion comprises playing out the static media portion followed by the second dynamic media portion.

3. The method of claim 1, wherein providing the second alert by playing out the static media portion and the second dynamic media portion comprises playing out the second dynamic media portion followed by the static media portion.

4. The method of claim 1, wherein providing the second alert by playing out the static media portion and the second dynamic media portion comprises playing out the static media portion, the second dynamic media portion, and one or more additional dynamic media portions.

5. The method of claim 1,
wherein the second alert event comprises receipt of message-alert data that indicates a voice mail message has been stored for a user of the alert device.

6. The method of claim 1, wherein the first dynamic media portion comprises a first video news recording, and the second dynamic media portion comprises a second video news recording.

7. The method of claim 1, wherein the static media portion comprises an introductory alert that comprises media selected from the group consisting of (i) a musical passage, and (ii) speech.

8. The method of claim 1, further comprising:
prompting a user for approval for the alert device to receive the alert update data; and
conditioning receiving the alert update data on receipt of user approval to receive the alert update data.

9. A system comprising:
a processor;
a data storage device comprising (i) a first data storage block containing a static media portion, wherein storage of the static media portion within the first data storage block first occurs while the system is being manufactured, (ii) a second data storage block containing a first dynamic media portion, wherein the second data storage block is distinct from the first data storage block, and wherein storage of the first dynamic media portion within the second data storage block first occurs after the system is manufactured, and (iii) a third data storage block containing computer-readable program instructions executable by the processor;
a communication interface that is operable to receive, from a network server, alert update data defining a new dynamic media portion; and
a user interface,
wherein the program instructions comprise instructions executable by the processor to detect a first alert event and responsively cause the user interface to provide a first alert by concurrently playing out, from within the first data storage block, the static media portion and, from within the second data storage block that is distinct from the first data storage block, the first dynamic media portion;
wherein the program instructions comprise instructions executable by the processor to cause the data storage device to store the alert update data,
wherein the user interface is operable to prompt a user for approval to play out the new dynamic media portion instead of the first dynamic media portion, and
wherein the program instructions comprise instructions, executable by the processor after the alert update data is stored in the data storage, to detect a second alert event and, if approval to play out the new dynamic media portion has been received at the user interface, then to responsively cause the user interface to provide a second alert by playing out the static media portion and the new dynamic media portion, otherwise, if approval to play out the new dynamic media portion has not been received at the user interface, then to responsively cause the user interface to provide the second alert by playing out the static media portion and the first dynamic media portion.

10. The system of claim 9,
wherein the program instructions comprise instructions executable by the processor to periodically send to the network server via the communication interface a request for alert update data, and
wherein the communication interface receives additional alert update data comprising another new dynamic media portion that may be played out with the static media portion in response to the device detecting another alert event.

11. The system of claim 9,
wherein the second alert event comprises the communication interface receiving data that indicates a phone call is available for connection to the system.

12. The system of claim 9, further comprising:
one or more speakers; and
a converter for converting the static media portion into signals that can be output by the one or more speakers,
wherein the converter converts the static media portion into one or more first signals that can be output by the one or more speakers to provide the alert, and
wherein the converter converts the static media portion into one or more signals that can be output by the one or more speakers to provide the second alert.

13. The method of claim 1, further comprising:
prior to storing the first dynamic media portion within the second data storage block within the data storage device, a user interface of the alert device detecting sounds uttered by a user of the alert device and converting the detected sounds to the first dynamic media portion.

14. The method of claim 13, wherein the alert device comprises a cellular phone.

15. The method of claim 1, further comprising:
while the received alert update data is being stored in the data storage device, playing out the first dynamic media portion as an alert.

16. The method of claim 1,
wherein the alert device is arranged as a programmable logic controller (PLC), and
wherein both the network server and the PLC are coupled to a communication network.

17. The method of claim 16,
wherein a media server is further connected to the communication network,
the method further comprising:
the network server receiving from the media server via the communication network a media update for sending as the second dynamic media portion.

18. The method of claim 16,
wherein the alert device communicates wirelessly according to an air interface standard, and
wherein detecting the second alert event includes the alert device detecting receipt of a wireless text message at the alert device.

19. The system of claim 9,
wherein the system is arranged as a Session Initiation Protocol (SIP) telephone that connects to the network server via a communication network.

20. The system of claim 9,
wherein the system is arranged as a programmable logic controller that couples to a communication network, and
wherein the communication interface comprises a wireless network interface card operable to communicate with the communication network via an air interface.

21. The method of claim 1, further comprising:
the alert device receiving from a sensor a signal that indicates a pressure level,
wherein detecting the first alert event includes the alert device comparing the received signal to a predefined pressure level threshold and detecting that the pressure level indicated by the received signal surpasses the predefined pressure level threshold.

22. The system of claim 9, further comprising:
a sensor to provide a signal that indicates a flow level or a pressure level,
wherein the program instructions to detect the first alert event include instructions to compare the provided signal to a predefined threshold and to detect that the flow level or the pressure level indicated by the provided signal surpasses the predefined threshold.

23. The method of claim 1, wherein the static media portion comprises an audio recording and the first dynamic media portion comprises a first visual image.

24. The method of claim 23, wherein the first dynamic media portion comprises an animation showing a series of weather radar images for a location of a user of the alert device.

25. The method of claim 24, wherein the first alert event comprises the alert device receiving a Short Message Service (SMS) message.

26. The method of claim 1, wherein the first dynamic media portion comprises a financial news or sports news recording.

* * * * *